Aug. 15, 1944.  A. PALME  2,355,998
SAFETY SYSTEM
Filed June 13, 1942
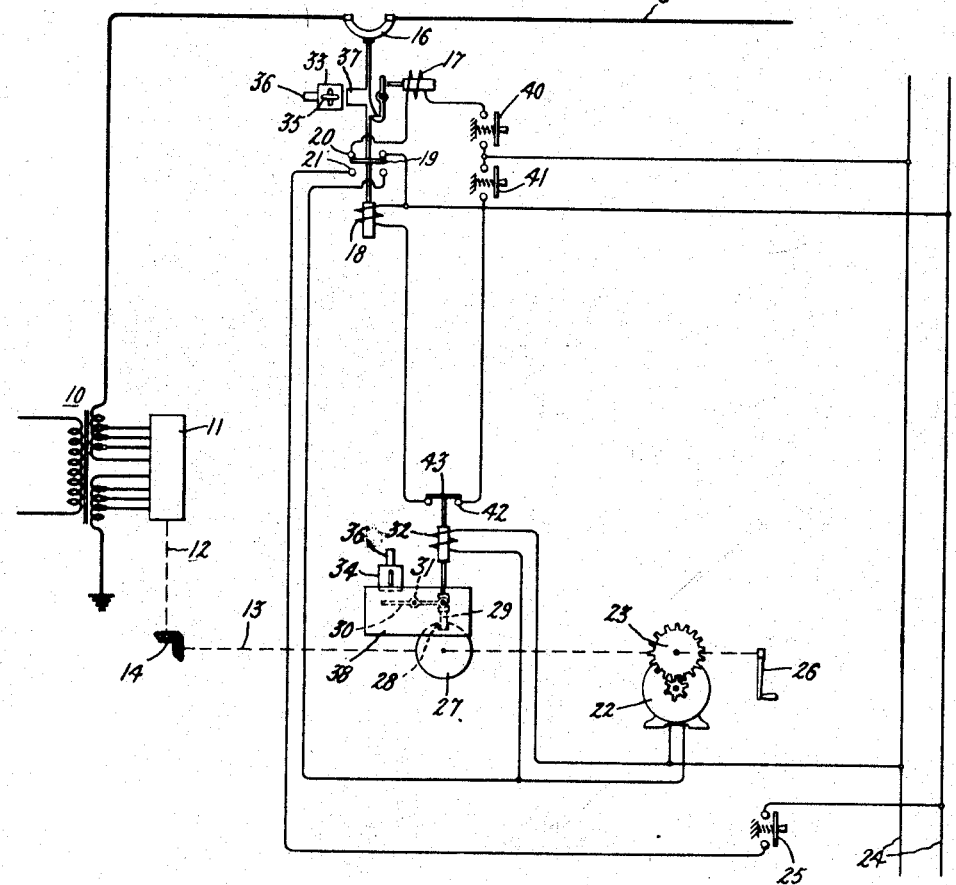
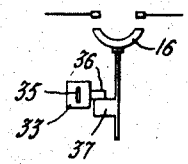
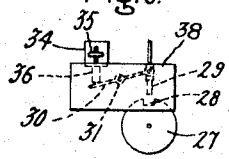
Inventor:
Arthur Palme,
by Harry E. Dunham
His Attorney.

Patented Aug. 15, 1944

2,355,998

UNITED STATES PATENT OFFICE 2,355,998

SAFETY SYSTEM

Arthur Palme, Pittsfield, Mass., assignor to General Electric Company, a corporation of New York Application June 13, 1942, Serial No. 446,960

6 Claims. (Cl. 171—119)

My invention relates to safety systems and more particularly to a system for preventing changes in connections of an electric translating apparatus unless predetermined conditions with respect to associated apparatus exist. Specifically, my invention is concerned with an interlocking scheme for preventing the changing of taps on the winding of an electric translating device such as a transformer when the winding is connected in an associated energized electric circuit.

Many transformers for industrial purposes have internal switching devices which permit changing of the load potential by changing taps, and consequently varying the internal connections of the windings. Since these changes are required very often, sometimes several times during a particular operation in an industrial plant, the tap changer associated with the electric translating device is adapted to be driven by a suitable motor which may be operated by remote control. In order to minimize the cost of such a transformer and associated tap-changing equipment, it is essential that the changing of the internal connections by operation of the tap changer must be accomplished only when the transformer is de-energized or, in any event, the winding upon which the connections are changed must be disconnected from an associated electric circuit. Such short interruptions of power to permit changing of the tapped winding connections is usually acceptable to industry, particularly when a much less expensive translating apparatus and tap-changing device may be utilized.

In order to be sure that the winding of the translating device upon which the connections have been changed is disconnected from an associated electric circuit when the tap changer is operated, it is customary to provide an interlock on the circuit breaker for controlling the connection between the tapped winding of the translating device and the associated electric circuit which opens the control circuit for the remote-control driving motor unless the circuit breaker is in the open position.

It is very desirable that operation of the tap changer may be accomplished by hand, particularly in an emergency when, for some reason or other, a failure of the motor driving means results, either through failure of the supply source of power for the driving motor or through some other abnormal condition. In any event, it is still essential that neither the motor driven operation nor the manual operation of the tap-changing device can be accomplished unless the winding upon which the connections are to be changed is disconnected from the associated electric circuit.

Accordingly, it is an object of my invention to provide a new and improved safety system or interlocking scheme to prevent changes of the electrical connections of an electric translating apparatus, where such changes may be accomplished by two different means, unless the electric translating apparatus is disconnected from an associated electric circuit.

It is another object of my invention to provide a new and improved safety system for an electric translating apparatus.

It is another object of my invention to provide interlocking means between an electrical device and an associated apparatus where said electrical device may be operated by two different means, which prevents either of said means from operating said device unless the associated apparatus is in a predetermined position.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing in which Fig. 1 is a diagrammatic representation of a safety system embodying my invention, and Figs. 2 and 3 are portions of the system of Fig. 1 shown in a different operating position than in Fig. 1.

Referring now to Fig. 1 of the drawing, I have illustrated an electric translating apparatus specifically illustrated as a transformer 10 of the type having internal switching devices which permit changing of the load potential by changing taps thereon. Such a tap-changing device is schematically illustrated at 11 which may be operated through any suitable driving means, such as vertical shaft 12 and horizontal shaft 13 interrelated by a suitable gear mechanism 14.

Transformer 10 is preferably connected to an associated electric circuit 15 through an associated apparatus comprising circuit interrupter 16 which I have illustrated as a latched closed type of circuit breaker having a trip coil 17, a closing coil 18, and a switch 19 for controlling "a" contacts 20 and "b" contacts 21. As will be understood by those skilled in the art, the so-called "a" contacts 20 are closed by switching member 19 when the circuit breaker 16 is closed and opened when the circuit breaker is opened. Conversely, the "b" contacts 21 are closed by switching member 19 when circuit breaker 16 is opened and are opened when circuit breaker 16 is closed.

Suitable operation of tap changer 11 through operation of driving means 12 and 13 may be accomplished by two separate means. A first means for operating the tap-changing device 11 comprises suitable motive means, such as electric motor 22 connected to shaft 13 through a gearing arrangement indicated at 23. This gearing arrangement is so arranged that one revolution of shaft 13 takes place for each tap changed on the winding of electric translating apparatus or transformer 10. Motor 22 may be energized from any suitable source of control power such as indicated at 24. Preferably a remote control switch indicated as push-button switch 25 is provided for controlling motor 22 and consequently tap-changing device 11. In order to be sure that the device to be operated, namely, tap-changing device 11 can not be operated unless the associated apparatus, namely, circuit breaker 16, is in the open position, the "b" contacts 21 of circuit breaker 16 are connected in the energization circuit of motor 22, thereby preventing undesirable motor operation when the winding of transformer 10 upon which the connections are to be changed is connected to associated electric circuit 15.

The second means for operating tap changer 11 is indicated as manual means comprising crank 26. With the arrangement described thus far, although the tap changer 11 can not be operated through motor 22 unless circuit breaker 16 is open, nevertheless manual operation could occur when circuit breaker 16 is closed, which would be very undesirable and, in accordance with my invention, I provide suitable interlocking means to prevent either manual or motor operation of tap changer 11 unless circuit breaker 16 is open.

To this end, I provide a suitable disk 27 on shaft 13 including a notch 28 therein, which notch is arranged to be at the top of the disk for any particular operative setting of the taps on transformer 10. For each tap change, as was mentioned above, shaft 13 and consequently disk 27 makes one complete revolution so that notch 28 will always be at the top as indicated at the completion of any tap-changing operation. A cooperating gravity operated plunger 29 is provided to engage notch 28 and lock disk 27 and consequently tap changer 11 in a predetermined position. Plunger 29 is preferably pivotally connected to a lever 30 rotatably mounted at 31. In order that plunger 29 may be removed from notch 28 upon energization of motor 22 a suitable solenoid 32 is provided which is connected to plunger 29. Solenoid 32 is energized in parallel with motor 22 so that closure of push-button switch 25 removes gravity operated plunger 29 from notch 28 and simultaneously therewith energizes motor 22.

In order to prevent manual operation of tap-changing device 11 when circuit breaker 16 is closed, I provide an interlocking means which comprises a pair of identical locks 33 and 34 of any well-known construction which are operable by a single key indicated at 35 and shown associated with lock 33 in Fig. 1 and lock 34 in Fig. 3. Each of the locks 33 includes a plunger 36 which must be in a predetermined position to permit removal of the key 35 from the lock. Lock 33 is mounted adjacent to circuit breaker 16 which is provided with an interference member or extension 37 thereon and, as will be obvious from Figs. 1 and 2, the extension 37 prevents the plunger 36 of lock 33 from being moved to the position permitting removal of key 35 unless circuit breaker 16 is open. When key 35 has been removed from lock 33, which can only be done when circuit breaker 16 is open, it may be inserted in lock 34 to move plunger 36 downwardly to engage lever 30 pivotally mounted at 31 as indicated in Fig. 3, thereby removing plunger 29 from notch 28, whereupon manual operation of tap changer 11 may be accomplished only when circuit breaker 16 is in the open position. Plunger 29 cannot be removed from notch 28 except through operation of lock 34 or solenoid 32 because of an enclosure schematically illustrated at 38 which prevents anyone from getting at plunger 29 or lever 30.

Circuit breaker 16 is provided with the well-known control arrangement comprising a tripping push button 40 connected in series with trip coil 17, and the "a" contacts 20, across power source 24. A closing switch illustrated as a push button 41 is connected in series with closing coil 18 and contacts 42 to be described hereinafter across power source 24. The contacts 42 are controlled by a switching member 43 operated by solenoid 32 so that whenever plunger 29 is removed from notch 28 either through operation of lock 34 or by solenoid 32, which are interrelated by lever 30, contacts 42 are opened thereby opening the closing circuit for circuit breaker 16. In other words, contacts 42 render the closing circuit for circuit breaker 16 ineffective whenever the plunger 29 is removed from notch 28 of disk 27.

The operation of the safety system embodying my invention will be obvious to those skilled in the art. Plunger 29, which is gravity operated, will normally be engaged in notch 28 of disk 27 and can only be removed either by energization of solenoid 32 or by operation of lock 34. In either event, circuit breaker 16 must be opened, since the key 35 can not be removed from lock 33 to operate lock 34 because of interference member 37 associated with circuit breaker 16 unless circuit breaker 16 is in the open position. Also, solenoid 32 can not be energized unless the contacts 21 are bridged by switching member 19 which requires that circuit breaker 16 be open. By virtue of lever 30, removal of gravity operated plunger 29 from notch 28 of disk 27 either by operation of lock 34 or by energization of solenoid 32 causes contacts 42 controlled by switching member 43 to be opened and, consequently, the closing circuit of circuit breaker 16 is rendered ineffective. It will be obvious, therefore, that the tap-changing device 11 can not be operated either manually through crank 26 or by depressing push-button switch 25 until circuit breaker 16 has first been opened by operation of trip switch 40.

While I have shown and described my invention as applied to a particular system of connections, and as embodying various devices diagrammatically shown, it will be obvious to those skilled in the art that changes and modifications may be made without departing from my invention and I therefore aim in the appended claims to cover all such changes and modifications as fall within the spirit and scope of my invention.

What I claim as new and desire to secure by Letters Patent of the United States is:

1. An interlocking arrangement between a tap changing mechanism for a transformer and a circuit interrupter controlling the energization of the transformer comprising a motor for operating said mechanism, locking means for preventing said mechanism from being operated, means for automatically releasing said locking means while said mechanism is being operated by said motor, and manually operable releasing means for said locking means controlled by the position of said circuit interrupter so that said manually operable means can be operated only while said circuit interrupter is in its open position.

2. An interlocking arrangement between a tap changing mechanism for a transformer and a circuit interrupter controlling the energization of the transformer comprising an electric motor for operating said mechanism, locking means for preventing said mechanism from being operated, electromagnetic means for releasing said locking means, means for energizing said electromagnetic means while said motor is energized, and manually operable releasing means for said locking means controlled by the position of said circuit interrupter so that said last mentioned releasing means can be manually operated only while said circuit interrupter is in its open position.

3. An interlocking arrangement between a tap changing mechanism for a transformer and a circuit interrupter controlling the energization of the transformer comprising an electric motor for operating said mechanism, locking means for preventing said mechanism from being operated, electromagnetic means for releasing said locking means, means controlled by said circuit interrupter for energizing said electromagnetic means while said motor is energized and said circuit interrupter is open, and manually operable releasing means for said locking means controlled by the position of said circuit interrupter so that said last mentioned releasing means can be manually operated only while said circuit interrupter is in its open position.

4. An interlocking arrangement between a tap changing mechanism for a transformer and a circuit interrupter controlling the energization of the transformer comprising an operating shaft for said mechanism, an electric motor for driving said shaft, locking means for preventing rotation of said shaft including a disk having a notch therein and a cooperating plunger member for preventing operation of said shaft, an electromagnet for moving said plunger member from said notch, means for simultaneously energizing said motor and said electromagnet, a manually operable device for moving said plunger member from said notch, and a mechanical interlock between said last mentioned device and said circuit interrupter for permitting operation of said last mentioned device only while said circuit interrupter is open.

5. An interlocking arrangement between a tap changing mechanism for a transformer and a circuit interrupter controlling the energization of the transformer comprising an operating shaft for said mechanism, an electric motor for driving said shaft, locking means for preventing rotation of said shaft including a disk having a notch therein and a cooperating plunger member for preventing operation of said shaft, an electromagnet for moving said plunger member from said notch, means for simultaneously energizing said motor and said electromagnet, a manually operable device for moving said plunger member from said notch, and a mechanical interlock between said last mentioned device and said circuit interrupter for permitting operation of said last mentioned device only while said circuit interrupter is open and closure of said circuit interrupter only while said last mentioned device is in a position to cause said plunger member to be in said notch.

6. An interlocking arrangement between a tap changing mechanism for a transformer and a circuit interrupter controlling the energization of the transformer comprising an operating shaft for said mechanism, an electric motor for driving said shaft, locking means for preventing rotation of said shaft including a disk having a notch therein and a cooperating plunger member for preventing operation of said shaft, an electromagnet for moving said plunger member from said notch, means for simultaneously energizing said motor and said electromagnet, a key operated device for moving said plunger member from said notch, a key operated device operable only when said circuit interrupter is in its open position for locking said circuit interrupter in its open position, and a common key for said key operated devices removable from said first mentioned key operated device only when said plunger member is in said notch and from said second mentioned key operated device only when said last mentioned device is in its locked position.

ARTHUR PALME.